United States Patent [19]
Schmitt et al.

[11] 3,882,080
[45] May 6, 1975

[54] SELF-HARDENING COMPOUND, PARTICULARLY FOR DENTAL-MEDICAL APPLICATION

[75] Inventors: Werner Schmitt; Robert Purrmann, both of Starnberg; Peter Jochum; Wolf-Dieter Zahler, both of Hechendorf, all of Germany

[73] Assignee: Espe Fabrik Pharmazeutischer Preparate GmbH, Seefeld, Oberbay, Germany

[22] Filed: Feb. 26, 1974

[21] Appl. No.: 445,827

Related U.S. Application Data

[63] Continuation-in-part of Ser. No. 215,139, Jan. 3, 1972, Pat. No. 3,804,794.

[30] Foreign Application Priority Data
Jan. 15, 1971 Germany.......................... 2101939

[52] U.S. Cl............ 260/42.29; 32/15; 260/29.6 M; 260/42.43; 260/42.52; 260/78.4 R; 260/874; 260/901; 260/998.11
[51] Int. Cl. ............................................. C08f 45/04
[58] Field of Search........ 260/784 R, 42.43, 998.11, 260/42.29, 42.52, 874, 901

[56] References Cited
UNITED STATES PATENTS
3,655,605  4/1972  Smith et al..................... 260/998.11
3,804,794  4/1974  Schmitt et al....................... 106/35

Primary Examiner—James H. Derrington
Attorney, Agent, or Firm—Ostrolenk, Faber, Gerb & Soffen

[57] ABSTRACT

Dental cements contain zinc oxide and an aqueous solution of a polymer of an unsaturated alpha, beta-dicarboxylic acid.

7 Claims, No Drawings

3,882,080

SELF-HARDENING COMPOUND, PARTICULARLY FOR DENTAL-MEDICAL APPLICATION

This is a continuation-in-part of application Ser. No. 215,139 filed Jan. 3, 1972 and now U.S. Pat. No. 3,804,794.

BACKGROUND OF THE INVENTION

The cements used in dentistry, which serve to strengthen dental prothesis parts and to produce underfillings and to close root canals, are divided substantially into three groups, namely:

1. Phosphate cements (see e.g. "Materials for the Practicing Dentist," p. 34–37, The C.V. Mosby Co., St. Louis, 1969).
2. Zinc oxide-eugenol-preparations (Ibid p. 44–48).
3. Polycarboxylate cements ( DOS 1,617,688).

The essential properties of the polycarboxylate cements, also compared to the other two types of cement, have been complied by H. Durner in "Das Deutsche Zahnaerzteblatt" vol. 23, no. 12/1969, p.583–586.

In a brief summary, the following can be said about the disadvantages of the presently used dental cement system:

Phosphate cements are harmful to the pulpa due to their strong acid reaction during setting; they are also porous and therefore offer no resistance to the penetration of micro-organisms which may cause secondary caries.

Zinc oxide-eugenol-preparations are not harmful to the pulpa, but are highly soluble; their compressive strength is much lower than that of the phosphate cements.

Polycarboxylate cements are harmless and highly insoluble, but less compression-resistant than phosphate cements.

In all three systems the compressive strength is inadequate in view of the fact that chewing pressure is rather high.

It should be noted parenthetically that the compressive strength of other dental cements, namely the so-called silicate cements, which are used for permanent fillings, is twice as high as that of the phosphate cements. However, they are extremely harmful to the pulpa and may therefore only be used over the top of linings.

Accordingly, it is the object of this invention to provide self hardening dental cements which are not harmful to the pulpa and have high compressive strength. This and other objects will become apparent to those skilled in the art from the following detailed description.

SUMMARY OF THE INVENTION

The present invention relates to dental cements and more particularly, relates to dental cements containing zinc oxide and an aqueous solution of a polymer of an unsaturated alpha, beta-dicarboxylic acid.

DESCRIPTION OF THE PREFRRED EMBODIMENTS

In accordance with the present invention, a self-hardening dental cement is provided containing, as the liquid component, an aqueous solution of a polymer of an unsaturated alpha, beta-dicarboxylic acid, and as the powder component, zinc oxide.

The liquid component is an aqueous solution of polymers of unsaturated alpha, beta-dicarboxylic acids. Preferred are the polymers of unsaturated alpha, beta-dicarboxylic acids with four to five carbon atoms. Particularly suitable is polymaleic acid. Polyitaconic acid, as well as copolymers of the above mentioned two acids and their copolymers with other unsaturated carboxylic acids, particularly acrylic acid, can also be used. In copolymers with acrylic acid, the latter is preferably present in an amount of 0.1 to 9.99% by mole, that is, in an amount of less than 10 % by mole.

The polymeric acids and their copolymers are used in aqueous, at least 20%, solutions. In general, a concentration of 65% will not be exceeded, otherwise gelling may easily set in or the solutions may become too viscous. The preferred concentration range is between 35 and 65%, particularly between 40 and 50%.

The solutions should be used in a viscosity of at least 0.5 poise; solutions with viscosities over 3,000 poise, as a rule over 600 poise, are generally not suitable since they are difficult to process and the stirred cements tend to form "cobwebs." A preferred viscosity range is between 2 and 200 poise/25° C, particularly between 5 and 100 poise/25°C.

The production of the water-soluble polymers used in this invention is known. (see e.g. DOS 1,944,756; 1,570,708; 1,645,100 as well as German Pat. No. 1,162,083; J.L. Lang et al.: J. of Polymer Science, A 1, 1123 (1963); C.S. Marvel et al.: J. of Organic Chemistry, 24, 599 (1959).

The polycarboxylic acids, particularly polymaleic acid, can be easily obtained according to known methods in solid form, for example, by further concentration of concentrated solutions in vacuum, by freeze drying, or by precipitation from aqueous solutions with non-solvents for use in predosing of dental cements as described below.

The liquid component can contain additionally polyacrylic acid, generally used for this purpose, so that a particularly great adhesion is achieved.

The powder component is substantially the conventional zinc oxide. Naturally, the zinc oxide used must be available in a purity appropriate for medical purposes; it must be particularly free of arsenic. Since the aqueous polycarboxylic solutions generally react rapidly with zinc oxide, deactivation by heating is necessary. Preferably, the zinc oxide will be heated to relatively high temperatures, particularly between 1,200° to 1,400°C for several hours in order to achieve sufficiently long preparation times.

As in the case of phosphate cements, the zinc oxide need not be 100% pure. It can contain, in known manner, certain portions of other metal oxides, particularly magnesium oxide or bismuth oxide, but not more than 20%, preferably up to 10%.

Other solid substances which are substantially inert, i.e., they do not react with the polycarboxylic acid of the liquid or only to a minor extent, can also be added to the powder. Such solid substances are, for example, aluminum oxide, calcium phosphate titanium dioxide, calcium fluoride or other flourides, which can also serve to improve the mechanical properties, to change the consistency of the stirred cement, and to achieve certain medicinal effects. Naturally, pigments, disinfectants and similar substances can also be added in known manner.

The two components, that is, the powder substantially of zinc oxide, and the polycarboxylic acid solution, are mixed in a ratio of 0.4:1 to 4:1 of powder to solution, depending on the consistency required by the dentist for the particular purpose. For cementing and root canal filling a relatively small powder addition will be used, while underfillings are mixed with a relatively large amount of powder, as is customary in dentistry. By varying the mixing ratio, it is also possible to vary the setting time: the more powder used, the sooner the setting will start. A preferred mixing range is a powder/liquid mixing ratio of 1:1 to 2.5:1. In general, the mechanical properties are the better the more powder is worked into the mixture.

The self-hardening compounds according to the invention generally have a processing range of one to several minutes, and, as a rule, are hard in less than 10 minutes.

In recent years, it has become increasingly popular to predose dental preparations in so-called shaking capsules. The liquid and powder are generally housed in two separate compartments and then combined directly before use by suitable devices, and subsequently mixed mechanically.

Predosing is also applicable to the compositions according to the invention. In a special embodiment, the usual subdivision into powder and liquid, that is, in the present case into zinc oxide and polycarboxylic acid solution, can be replaced by a subdivision into zinc oxide, solid polycarboxylic acid, and water. This embodiment has the advantage that it permits reliable predosing and facilitates mixing, since it avoids the relatively viscous solutions. Such systems can be furthermore so varied that the solid components, that is, zinc oxide and polydicarboxylic acid, are premixed and packed as a predosed powder mixture since the solid substances do not react with each other. The weight ratio of zinc oxide to polymer can be 20:1–0.6:1, preferably 10:1–0.8:1 and most preferably 5:1–1.5:1 or 2:1–6.25:1. The second component is then water, if necessary, with bacteriostatic additions (see DOS 1,903,087).

The pre-mixed dental preparation according to the invention can be produced and stored in small amounts which suffice as a pre-dosed preparation, mixed with water, for immediate use at the dentist for one patient, and it can also be produced and stored as a pre-mixed preparation of some hundred grams or more of whose bulk the dentist can take the smaller quantity which he needs, mixed with water, for the treatment of one patient.

The usual division, that is, polydicarboxylic acid solution, on the one hand, and zinc oxide, on the other hand, is also suitable for predosing.

The compositions according to the invention can be used primarily in the dental sector for strengthening tooth prosthesis parts, such as inlays, crowns, bridges etc., as well as orthodontic devices, as underfilling and pulp-protectives under toxic permanent fillings like silicate cements or plastic fillings based on methyl methacrylate, as well as root fillers.

Unlike the phosphate cements, the cements according to the invention are not harmful to the pulpa and are not porous; the latter property is of great importance for avoiding secondary caries. Compared to the zinc oxide-eugenol-preparations and the polycarboxylate cements, the cements according to the invention are characterized by a far greater compressive strength.

It could not be expected that cements containing polymaleic acid would show these properties and particularly a superior compressive strength.

Examples

In the following examples the addition of pigment, which is customary in the production of colorations resembling teeth is not specifically mentioned since it corresponds to the state of the art.

EXAMPLE 1

Polymaleic acid, suitable for dental purposes, and produced according to the method of DOS 1,944,756 is dissolved with water to a concentration of 51 % by weight. The solution has a viscosity of 18 poise/25°C.

The powder used is a mixture of a zinc oxide and magnesium oxide in a ratio of 19:1, both substances meeting the purity requirements of DAB 7. It is produced in known manner by heating to 1,350°C, grinding and shifting through a sieve of 60 $\mu$ mesh.

When the polymaleic acid solution and the powder are mixed in a weight ratio of 1:1.3, we obtained a mixture that is highly suitable as a strengthening cement for dental purposes, and which hardens within a few minutes. The compressive strength tested according to the guidelines of the FDI specification (FDI - Federation Dentaire Internationale) no. 6, par. 4.3.1; 4.3.2 and 4.3.4, is 1,210 kg/cm$^2$.

EXAMPLE 2

When the components of Example 1 were used, but in a powder-liquid ratio of 0.9:1, we obtained a cement which is particularly suitable for strengthening large tooth prosthesis parts, like multipart bridges etc. The compressive strength is, in this case, 950 kg/cm$^2$ after one day, and 1,040 kg/cm$^2$ after 7 days.

EXAMPLE 3

The components of Example 1 are mixed in a powder-liquid ratio of 3:1. We obtained a consistency which is particularly suitable for underfillings; the setting starts after about 1 ½ minutes and leads very soon to a solid product. The compressive strength, measured according to the specification of FDI, is 1,350 kg/cm$^2$.

EXAMPLE 4

Polymaleic acid, produced according to DOS 1,645,100, is used as a 47 % aqueous solution. When this solution is mixed with 1.2 parts of the powder of example 1, we obtained a mixture which is suitable, inter alia, for strengthening plastic crowns.

The following long-term tests prove that the compressive strength of the set cement under water increases over a long-time period.

Compressive strength in storage under water at 36°C

| Days | 1 | 2 | 8 | 16 | 32 | 64 | 128 |
|---|---|---|---|---|---|---|---|
| Compressive strength (kg/cm$^2$) | 1070 | 1090 | 1220 | 1240 | 1190 | 1200 | 1220 |

EXAMPLE 5

The solution of example 4 is used and mixed with zinc oxide, which is deactivated in known manner by heating. This powder is yellowish and is therefore used without pigment addition. When the powder and liquid are mixed in a ratio of 1.5:1 we obtained a strengthening cement for inlays.

EXAMPLE 6

70 g of the powder of example 1 are mixed with 30 g finely ground bismuth phosphate. The powder thus obtained is made into a paste with 30 % aqueous polymaleic acid solution in a ratio of 1.6:1 and used for filling root canals.

EXAMPLE 7 a 58 % solution of polymaleic acid, produced according to DOS 1,570,708 and subsequent hydrolysis, is made into a paste with 1.5 parts of the powder of example 1 and is used as a pulp protective under silicate cement fillings.

EXAMPLE 8

60 g of the powder of example 1 are mixed with 40 g aluminum oxide (particle size less than 20 $\mu$) and made into a paste with the liquid of example 1 in a ratio of 2.2:1. The cement thus obtained has a compressive strength of 1,850 kg/cm$^2$.

coated aluminum, and welded. The foil bags are placed into the cover part of two-compartment containers, as are described in DOS 1,910,885. 105 mg of the powder of example 1 are filled into the container part provided as a mixing chamber.

When such a filled capsule, as described in DOS 1,910,885, is used, we obtain by means of a mechanical shaking device, a compound of optimum consistency which is suitable as a strengthening cement.

COMPARISON TESTS

In order to confirm the higher compressive strength, we made comparison tests with commercial preparations of the three systems. Since the compressive strength depends to a great extent on the consistency of the mixed cement, as mentioned above, comparison tests are only meaningful if we start in all cases from the same consistency. In this connection, it should be mentioned that the relatively high compressive strength values which are indicated in some examples in DOS 1,617,688 were always achieved with mixtures where a relatively large amount of powder was used, so that the resulting viscosity was far above normal. Such preparations are difficult to process and thus undesired in dental practice.

In the comparative measurements, we proceeded therefore strictly according to the guidelines of the FDI specification no. 6 regarding consistency, production of the test pieces, and measuring method. We therefore tested compositions whose consistency meets best the requirements in dental practice.

RESULTS:

| Material | | Compressive strength (kg/cm$^2$) |
|---|---|---|
| According to the invention, | ex. 1 | 1,210 |
| According to the invention, | ex. 4 | 1,070 |
| phosphate cement | A | 740 |
| phosphate cement | B | 650 |
| zinc oxide-eugenol-preparation | C | 105 |
| zinc oxide-eugenol-preparation | D | 145 |
| EBA cement | *E | 510 |
| Polycarboxylate cement | F | 580 |
| Polycarboxylate cement | G | 530 |

*Commercial preparation based zinc oxide-eugenol, improved by the addition of EBA (o-ethoxy-benzoic acid).

Names of the commercial products:
A - Fixodont
B - Bayer Phosphatzement
C - Crownal
D - Crownal with fluoride
E - Opotow EBA
F - Durelon
G - Poly C cementation

EXAMPLE 9

When the powder of example 1 is mixed with 3 % calcium fluoride, we obtained, after stirring in the liquid of example 1, a cement which is particularly suitable for orthodontic purposes.

EXAMPLE 10

Polyitaconic acid, produced according to DOS 1,944,756 is used in a 54 % aqueous solution. 1.0 g of the solution is stirred with 2.1 g of the powder mixture of example 8 and used as an underfilling cement.

EXAMPLE 11

The polymaleic acid solution of example 1 is filled, in portions of 75 mg, into foil bags consisting of plastic- The comparison tests clearly prove the superiority of the cements according to the invention.

Instead of the polydicarboxylic acids used in the examples, other polymers of unsaturated alpha, beta-dicarboxylic acids as well as copolymers thereof can be used. Particularly suitable are copolymers of maleic acid and itaconic acid, where the maleic acid portion is preferably relatively high, for example, 80% by mole. Suitable are also copolymers of unsaturated alpha, betadicarboxylic acids with unsaturated monocarboxylic acids, particularly acrylic acid or methacrylic acid. Here too, copolymers with a relatively high content of dicarboxylic acid units deserve preference, for example, copolymers which contain primarily maleic acid, in addition to acrylic acid or methacrylic acid, particularly copolymers which contain more than 90 % by mole maleic acid.

Also suitable are polymers or copolymers of the above mentioned type which additionally contain small quantities, that is, not more than 10% by mole, of monomers that are free of carboxyl groups. Particularly suitable are copolymers with methacrylic esters, acrylic amide, methacrylic amide, as well as their derivatives substituted on nitrogen.

For the following examples known methods were applied to obtain polymers in solid form, e.g. by precipitating from a concentrated aqueous solution with solvents miscible with water, by drying aqueous solutions in a thin layer, preferably in the presence of drying agents, or on cylinder drying machines by applying external heat. Also, by freeze-drying from aqueous solutions, these polymers can be obtained as dry powders.

Afterwards the polymers are finely divided; during this manipulation there can be added favorably anti-blocking agents in small quantities, as e.g. metal stearates, especially zinc stearate, or highly dispersed silica.

In the following examples the addition of one or more pigments and other usual additives which are customary in the production of dental cements is not specifically mentioned since it corresponds to the state of the art.

EXAMPLE 1

100 g of solid polymaleic acid are mixed with 280 g desactivated zinc oxide and 2 g Aerosil (highly dispersed silica). In order to get a strengthening cement for gold inlays 0.38 g of this powder mixture are spatulated with 0.11 g water. The mixture hardens after a few minutes; the compressive strength of this cement is 1,020 kg/cm$^2$ after 24 hours.

EXAMPLE 2

For making a cement to protect the pulp, a powder mixture of 100 g polymaleic acid and 400 g desactivated zinc oxide is made. 0.5 g of this mixture are spatulated with 0.1 g water. Thus we obtain a quickly hardening dental cement which is suited for cavity linings under self-hardening dental filling materials on methyl methacrylate basis.

EXAMPLE 3

The powder mixture of Example 2 is filled, in portions of each 400 mg, in the mixing chamber of two compartment containers as are described in DOS 1,910,885. Furthermore the capsules contain in the cover part 85 mg water each being stored in foil bags of plastic coated aluminum. When such a filled capsule is used, as described in DOS 1,910,885, we obtain by means of a mechanical shaking device, a cement of optimum consistency for cavity linings.

EXAMPLE 4

310 g desactivated zinc oxide, containing 5 % by weight of magnesium oxide and 10 % by weight of aluminum oxide, are mixed with 100 g finely ground polyitaconic acid. When this powder is mixed with water in a weight ratio of 4:1, a strengthening cement is obtained, the compressive strength of which is 930 kg/cm$^2$ after 24 hours.

EXAMPLE 5

The following components are mixed:
100 g polymaleic acid,
20 g polyacrylic acid,
200 g sintered zinc oxide and
2 g zinc stearate.

By adding one part of water to 3.2 parts of the above mentioned powder, we obtain a mixture which is well suitable as a strengthening cement for crowns and bridges.

EXAMPLE 6

For use in capsules in predosed quantities the powder mixture of Example 5 is filled in portions of 320 mg into the capsules mentioned in Example 3, which also contain 110 mg water in foil bags. By means of a mechanical shaking device we obtain a cement of similar consistency to that one described in Example 5.

EXAMPLE 7

50 g of a copolymer, which contains 94 mol % maleic acid and 6 mol % methacrylic acid dimethylamide, are mixed with 150 g desactivated zinc oxide and filled in capsules, in portions of each 450 mg.

The cover part of the capsule contains foil bags with 130 mg water each to which 0.5 % by weight of Dehydol are added as a wetting agent. By mixing these components mechanically, we obtain a quickly hardening strengthening cement.

Various changes and modifications can be made in the product of this invention without departing from the spirit and scope thereof. The various embodiments set forth herein were intended to further illustrate the invention but were not intended to limit it.

We claim:

1. A pre-mixed dental preparation for the preparation of a self-hardening composition when mixed with water consisting essentially of zinc oxide and a polymer of an unsaturated alpha, beta-dicarboxylic acid selected from the group consisting of homopolymers of unsaturated alpha, beta-dicarboxylic acids of four to five carbon atoms and copolymers of said acids with each other and with less than 10 mol percent of an unsaturated monocarboxylic acid, acrylamide, methacrylic ester or methacrylic amide wherein the weight ratio of zinc oxide to said polymer is 20:1 to 0.6:1.

2. The pre-mixed preparation of claim 1 wherein the polymer is polymaleic acid.

3. The pre-mixed preparation of claim 1 wherein the polymer is polyitaconic acid.

4. The pre-mixed preparation of claim 1 additionally containing polyacrylic acid.

5. The pre-mixed preparation of claim 1 wherein said ratio is 0.8:1 to 10:1.

6. The pre-mixed preparation of claim 1 wherein the weight ratio of zinc oxide to polymer is 5:1 to 1.5:1.

7. The pre-mixed preparation of claim 1 wherein said ratio is 2:1 to 6.25:1.

* * * * *